United States Patent [19]

Bogan

[11] Patent Number: 4,927,905
[45] Date of Patent: May 22, 1990

[54] PROCESS FOR THE PRODUCTION OF AROMATIC HYDROXYL-CONTAINING COMPOUND-HYDROCARBON RESINS

[75] Inventor: Gary W. Bogan, Lake Jackson, Tex.

[73] Assignee: The Dow Chemical Company, Midland, Mich.

[21] Appl. No.: 270,564

[22] Filed: Nov. 14, 1988

[51] Int. Cl.⁵ .............................................. C08G 83/00
[52] U.S. Cl. ...................................... 528/205; 528/171
[58] Field of Search ................................ 528/205, 171

[56] References Cited

U.S. PATENT DOCUMENTS

| | | | |
|---|---|---|---|
| 2,537,636 | 1/1951 | Kitchen | 260/45.95 |
| 3,357,948 | 12/1967 | Stockmann et al. | 260/45.95 |
| 3,536,734 | 10/1970 | Vegter et al. | 260/348.6 |
| 3,625,874 | 12/1971 | Cottman et al. | 260/5 |
| 3,983,091 | 9/1976 | Gloth et al. | 260/45.95 H |
| 3,984,372 | 10/1976 | Cottman | 260/47 UA |
| 4,056,513 | 11/1977 | Lahourcade et al. | 260/62 |
| 4,301,311 | 11/1981 | Müller et al. | 568/719 |
| 4,390,680 | 6/1983 | Nelson | 528/97 |
| 4,394,497 | 7/1983 | Nelson et al. | 528/101 |
| 4,701,517 | 10/1987 | Daughenbaugh, Jr. | 528/205 |

*Primary Examiner*—Harold D. Anderson

[57] ABSTRACT

Hydrocarbon-aromatic hydroxyl-containing resins are prepared by (1) reacting an unsaturated hydrocarbon with an aromatic hydroxyl-containing compound in the presence of a Lewis acid, (2) neutralizing said Lewis acid with an inorganic base and (3) removing the unreacted aromatic hydroxyl-containing compound therefrom.

12 Claims, No Drawings

PROCESS FOR THE PRODUCTION OF AROMATIC HYDROXYL-CONTAINING COMPOUND-HYDROCARBON RESINS

FIELD OF THE INVENTION

The present invention pertains to a process for the production of aromatic hydroxyl-containing compound hydrocarbon resins, particularly phenol-dicyclopentadiene resins.

BACKGROUND OF THE INVENTION

Vegter et al. in U.S. Pat. No. 3,536,734, Nelson in U.S. Pat. No. 4,390,680 and Nelson et al. in U.S. 4,394,497 disclose the preparation of resins from unsaturated hydrocarbons such as cyclopentadiene or oligomers thereof and a phenol or substituted phenol by reacting the unsaturated compound with the phenol in the presence of a Lewis acid catalyst and subsequently removing the excess phenol. When $BF_3$ is employed as the catalyst, the phenol, when stripped from the product, contains corrosive fluorine-containing compounds which are detrimental to the piping and vessels in phenol recovery systems. It is therefore desirable to have available a method which would reduce or eliminate the amount of corrosive elements in the phenol recovered from the reaction mixture in the preparation of such phenol-hydrocarbon resins.

SUMMARY OF THE INVENTION

The present invention pertains to an improvement in the preparation of hydrocarbon-aromatic hydroxyl-containing compound resins wherein an unsaturated hydrocarbon or mixture of unsaturated hydrocarbons are reacted with an aromatic hydroxyl-containing compound or mixture of such compounds in the presence of a Lewis acid and subsequently removing the phenol therefrom; wherein the improvement resides in neutralizing the Lewis acid with an inorganic base prior to recovery of unreacted aromatic hydroxyl-containing compound without removing the salts formed from the catalyst neutralization thereby producing a product essentially free of corrosive Lewis acid.

DETAILED DESCRIPTION OF THE INVENTION

The process of reacting the unsaturated hydrocarbon with the aromatic hydroxyl-containing compound can best be conducted in two steps.

In the first step, the unsaturated hydrocarbon is fed slowly into a mixture of the aromatic hydroxyl-containing compound and a suitable catalyst at temperatures suitably from about 40° C. to about 130° C., more suitably from about 50° C. to about 100° C., most suitably from about 60° C. to about 90° C. for a period of time sufficient to complete the addition of the unsaturated hydrocarbon while maintaining the exothermic reaction temperature within the above stated limits, suitably from about 0.25 to about 8, more suitably from about 0.5 to about 6, most suitably from about 1 to about 4 hours.

At temperatures below about 40° C., the desired reaction may not proceed at a reasonable rate. At temperatures above about 130° C., decomposition of the unsaturated hydrocarbon may occur, especially when dicyclopentadiene is employed.

In this first step, any pressure either at, above or below atmospheric pressure is suitable. However, for convenience, pressures of suitably from about 13 psia to about 60 psia, more suitably from about 14 psia to about 40 psia, most suitably from about 14 psia to about 30 psia are employed. At pressures below about 13 psia, volatilization of the reactants or catalyst may occur. At pressures above about 60 psia, special high pressure reactors and processing equipment may be required.

In the second step, the reaction mixture of the first step is allowed to digest at temperatures suitably from about 90° C. to about 180° C., more suitably from about 140° C. to about 150° C. for a period of time sufficient to substantially complete the reaction between the unsaturated hydrocarbon(s) and aromatic hydroxyl-containing compound(s), suitably from about 1 to about 8, more suitably from about 2 to about 6, most suitably from about 3 to about 4 hours.

At temperatures below about 90° C., the reaction intermediates may not rearrange to form the desired products. At temperatures above about 130° C., decomposition of the unsaturated hydrocarbon may occur, especially when dicyclopentadiene is employed.

In this step, any pressure either at, above or below atmospheric pressure is suitable. However, for convenience, pressures of suitably from about 13 psia to about 60 psia, more suitably from about 14 psia to about 40 psia, most suitably from about 14 psia to about 30 psia are employed. At pressures below about 13 psia, volatilization of the reactants or catalyst may occur. At pressures above about 60 psia, special high pressure reactors and processing equipment may be required.

Higher reaction temperatures require shorter reaction times whereas lower reaction temperatures require longer reaction times.

The unsaturated hydrocarbon and the aromatic hydroxyl-containing compound are reacted in amounts which provide a molar ratio of aromatic hydroxyl-containing compound to unsaturated hydrocarbon suitably from about 1:1 to about 20:1, more suitably from about 2:1 to about 15:1, most suitably from about 3:1 to about 10:1. When the molar ratio is above about 20:1, reactor capacity is reduced by excess reactants and therefore effective yields are reduced. No particular advantage is seen for conducting the reaction at higher ratios. When the molar ratio is below about 1:1, incomplete reaction of the unsaturated hydrocarbon will likely occur, thus preventing complete conversion of the reactants to the desired product.

The resinous product can be recovered, if desired, from the reaction mixture by simply removing the excess aromatic hydroxyl-containing compound by distillation or the like. In some instances, the aromatic hydroxyl-containing resinous product can be employed directly in the reaction mass without any purification. In the preparation of epoxy resins therefrom, epihalohydrin can be blended with the reaction mass and depending upon the particular process employed for the preparation of epoxy resins reacted accordingly in the presence of suitable catalysts and the resultant halohydrin intermediate product converted to the glycidyl ether by reaction with a basic acting compound such as, for example, an alkali metal or alkaline earth metal hydroxide, carbonate or bicarbonate. In the preparation of cyanate resins, the reaction mass can be reacted directly with or without purification with cyanogen chloride or cyanogen bromide to produce a polycyanate resin.

Suitable unsaturated hydrocarbons which can be employed herein include, for example, those described by Vegter et al. in U.S. Pat. No. 3,536,734, Nelson in U.S. Pat. No. 4,390,680, Gebhart et al. in U.S. Pat. No. 3,557,239 and Nelson in U.S. Pat. No. 4,167,542, all of which are incorporated herein in their entirety.

Particularly suitable unsaturated hydrocarbons which, either in crude or purified state, can be employed herein include, for example, butadiene, isoprene, piperylene, cyclopentadiene, cyclopentene, 2-methylbutene-2, cyclohexene, cyclohexadiene, methyl cyclopentadiene, dicyclopentadiene, limonene, dipentene, linear and cyclic dimers of piperylene, methyl dicyclopentadiene, dimethyl dicyclopentadiene, norbornene, norbornadiene, ethylidine norbornene, mixtures thereof and the like. Also suitable unsaturated hydrocarbons include the other dimers, codimers, oligomers and cooligomers of the aforementioned unsaturated hydrocarbons. Particularly suitable unsaturated hydrocarbons which can be employed herein include, for example, a dicyclopentadiene concentrate containing from about 70 to about 100 percent by weight of dicyclopentadiene; from zero to about 30 percent by weight of $C_9$–$C_{12}$ dimers or codimers of $C_4$–$C_6$ dienes such as, for example, cyclopentadieneisoprene, cyclopentadiene-piperylene, cyclopentadienemethylcyclopentadiene, and/or dimers of isoprene, piperylene, methyl cyclopentadiene and the like; from about zero to about 7 percent by weight of $C_{14}$–$C_{18}$ trimers of $C_4$–$C_6$ dienes and from about zero to about 10 percent by weight of aliphatic diolefins such as, for example, piperylene, isoprene, 1,5-hexadiene and cyclic olefins such as cyclopentadiene, methyl cyclopentadiene, cyclopentene and the like. Methods of preparations for these dicyclopentadiene concentrates and more detailed descriptions thereof can be found collectively in U.S. Pat. No. 3,557,239 issued to Gebhart et al and U.S. Pat. No. 4,167,542 issued to Nelson, both of which are incorporated herein by reference.

Also, particularly suitable unsaturated hydrocarbons which can be employed herein include a crude dicyclopentadiene stream containing form about 10 to about 70 percent by weight dicyclopentadiene, from about 1 to about 10 percent codimers and dimers of $C_4$–$C_6$ hydrocarbons (described above), from about zero to about 10 percent oligomers of $C_4$–$C_6$ dienes and the balance to provide 100 percent, $C_4$–$C_6$ alkanes, alkenes and dienes.

Also, particularly suitable unsaturated hydrocarbons which can be employed herein include a crude piperylene or isoprene stream containing from about 30 to about 70 percent by weight piperylene or isoprene, about zero to about ten percent by weight $C_9$–$C_{12}$ and codimers of $C_4$–$C_6$ dienes, and the balance to provide 100 percent by weight of $C_4$–$C_6$ alkanes, alkenes and dienes.

Also particularly suitable unsaturated hydrocarbons which can be employed herein include a composition comprising from about 95 percent to about 100 percent by weight of dicyclopentadiene and the balance, if any, to provide 100 percent by weight of $C_4$–$C_7$ saturated or unsaturated hydrocarbons or oligomers thereof.

Also, particularly suitable are hydrocarbon oligomers prepared by polymerization of the reactive components in the above hydrocarbon streams e.g., dicyclopentadiene concentrate, crude dicyclopentadiene, crude piperylene or isoprene, individually or in combination with one another or in combination with high purity diene streams.

Suitable aromatic hydroxyl-containing compounds which can be employed herein include those described in the aforementioned patents by Vegter et al., Gebhart et al. and Nelson. Suitable such aromatic hydroxyl-containing compounds include, for example, those compounds which contain one or two aromatic rings, at least one phenolic hydroxyl group and at least one ortho or para ring position with respect to a hydroxyl group available for alkylation. These and others are disclosed in the aforementioned patents by Vegter et al., Gebhart et al. and Nelson which have been incorporated herein by reference.

Particularly suitable aromatic hydroxyl-containing compounds which can be employed herein include, for example, phenol, chlorophenol, bromophenol, dimethylphenol, o-cresol, m-cresol, p-cresol, hydroquinone, catechol, resorcinol, guaiacol, pyrogallol, phloroglucinol, isopropylphenol, ethylphenol, propylphenol, t-butyl-phenol, isobutylphenol, octylphenol, nonylphenol, cumylphenol, p-phenylphenol, o-phenylphenol, m-phenylphenol, Bisphenol A, dihydroxydiphenyl sulfone, mixtures thereof and the like.

Suitable Lewis acid catalysts which can be employed herein include, for example, those described in the aforementioned Vegter et al. U.S. Pat. No. 3,536,734 and Nelson U.S. Pat. No. 4,390,680. Particularly suitable catalysts include, for example, $BF_3$, $AlCl_3$, $FeCl_3$, $SnCl_4$, the coordination complexes thereof, and combinations thereof and the like.

The Lewis acid catalyst is employed in a catalytically effective amount, i.e. that amount which will sufficiently catalyze the reaction between the unsaturated hydrocarbon and the aromatic hydroxyl-containing compound at the particular reaction conditions employed. Usually, these amounts include that which provides a molar ratio of catalyst to aromatic hydroxyl-containing compound suitably from about 0.002:1 to about 0.1:1, more suitably from about 0.003:1 to about 0.05:1, most suitably from about 0.003:1 to about 0.01:1.

Suitable inorganic bases which can be employed herein include, for example, alkali metal and alkaline earth metal hydroxides, carbonates and bicarbonates. Particularly suitable such bases include, for example, potassium hydroxide, sodium hydroxide, potassium carbonate, sodium carbonate, potassium bicarbonate, sodium bicarbonate, combinations thereof and the like. The alkali metal and alkaline earth metal hydroxides can be employed, if desired, as aqueous solutions.

The inorganic base is employed in amounts which provide a molar ratio of base to catalyst suitably from about 1:1 to about 3:1, more suitably from about 1:1 to about 2:1, most suitably from about 1:1 to about 1.1:1. When the ratio is below about 1:1, complete neutralization of the catalyst does not occur, thus allowing the undesirable corrosive catalyst decomposition products to remain in the reaction mixture. When the molar ratio is above about 3:1, molecular weight and viscosity of the product may undesirably increase.

The neutralization reaction is conducted at a temperature suitably from about 30° C. to about 180° C., more suitably from about 40° C. to about 160° C., most suitably from about 40° C. to about 150° C. suitably at a pressure of from about 13 psia to about 60 psia, more suitably from about 14 psia to about 40 psia, most suitably from about 14 psia to about 30 psia; for a time sufficient to complete the reaction, suitably from about 0.25 to about 4, more suitably from about 0.5 to about 3, most suitably form about 1 to about 2, hours.

At temperatures below about 30° C., the product mixture may become too viscous to allow proper agitation for neutralization to be effective.

At temperatures above about 180° C., it is possible that undesirable reactions could occur.

At pressures below about 13 psia, volatilization of the reactants or catalyst could occur.

At pressures above about 60 psia, special equipment may be required.

Higher reaction temperatures require shorter reaction times whereas lower reaction temperatures require longer reaction times.

The following examples are illustrative of the present invention, but are not to be construed as to limiting its scope in any manner.

EXAMPLE 1

A. Preparation of Dicyclopentadiene-Phenol Resin

Phenol (2714 g, 28.84 moles) is melted in a 5-liter round-bottom flask equipped with mechanical stirrer, temperature controller, and heating mantle. While stirring at 70° C., $BF_3$ etherate (12.38 g, 0.0873 mole) is added. Dicyclopentadiene (381.3 g, 2.88 moles) is added dropwise with the heating mantle removed. The addition rate is controlled so as to maintain the temperature between 70°–85° C., with the total addition taking about one hour. Following the dicyclopentadiene addition, the reaction temperature is raised to 145° C. and maintained for three hours. This reaction mixture is then cooled to ambient temperature.

B. Neutralization with KOH (3.1:1 Molar Ratio of KOH to $BF_3$)

A 1-liter round-bottom flask is charged with 506 g of the reaction mixture (theoretically containing 0.0147 eq. of $BF_3$) from "A" above. After heating to about 40° C., 6.2 g (0.0485 eq.) of a 44.1% aqueous KOH solution are added, and the mixture heated to 145° C. At 145° C., vacuum is applied and the normal vacuum strip is carried out, finishing at 226° C. and 2 mm Hg.

C. Neutralization with KOH (1.1:1 Molar Ratio of KOH to $BF_3$)

A 1-liter round-bottom flask is charged with 447 g of the reaction mixture (theoretically containing 0.0132 eq. of $BF_3$) from "A" above. After heating to about 40° C., 1.84 g (0.0145 eq.) of a 44.1% aqueous KOH solution are added, and the mixture heated to 145° C. At 145° C., vacuum is applied and the normal vacuum strip is carried out, finishing at 221° C. and 2 mm Hg.

COMPARATIVE EXPERIMENT A

A 1-liter round-bottom flask is charged with 605 g of the reaction mixture from Example 1A. After heating to 149° C., vacuum is applied and the excess phenol is collected in three fractions. The vacuum strip took one hour and finished at a maximum temperature of 229° C. at 2 mm Hg.

The excess phenol removed by vacuum stripping each of the above runs from Examples 1B and 1C and Comparative Experiment A is collected in three fractions. Each fraction, as well as the finished product from each run, is analyzed by x-ray emission spectroscopy for boron, fluorine, and potassium content.

Average functionality and phenolic equivalent weight of each novolac product are calculated from gel permeation chromatograms.

Viscosity measurements are made on a Brookfield Digital Viscometer, Model LVTD, equipped with a Model 84 Programmable Temperature Controller and a #18 spindle.

Product Characterization

Introducing KOH to neutralize the $BF_3$ catalyst has no observable effects on the hydrocarbon novolac process.

Table 1 summarizes the viscosity and gel permeation chromatography (GPC) data for the control and the KOH modified hydrocarbon novolac products. At 3.1:1 KOH:$BF_3$, the viscosity measured for the hydrocarbon novolac rose dramatically, but was unaffected at 1.1:1. The GPC data in Table I does not indicate any significant changes in functionality or equivalent weight as a result of the KOH neutralization.

Fluorine and Boron Distribution

The distribution of the fluorine and boron in each run is determined by analyzing each novolac product and the phenol fractions taken overhead during the vacuum stripping process. These results are summarized in Tables II and III. Table II shows the amount of each product and each phenol fraction recovered, in grams, and the amount of fluorine and boron detected in each product and in each phenol fraction, in parts per million (ppm). Table III shows the fluorine and boron mass balances in grams. In each case, the amount of fluorine detected is considerably lower than theoretical. This may be partially due to the formation of some HF which could have escaped from the system through the condenser which is open to the atmosphere. The discrepancies between the detected and theoretical amounts of boron may be a reflection of the inaccuracy of the analytical method. However, the data clearly shows that in the control run a large percentage of the fluorine and boron are taken overhead with the phenol during the vacuum strip. Whereas, the addition of KOH to the novolac runs prior to vacuum stripping the phenol serves the desired purpose of preventing significant amounts of boron and fluorine from being taken overhead during the strip.

TABLE I

|  | COMP. EXPT. A* | EX. 1B | EX. 1C |
|---|---|---|---|
| KOH/$BF_3$, mole ratio | 0 | 3.1/1 | 1.1/1 |
| Reactor Size | 1-liter | 1-liter | 1-liter |
| GPC Data: | | | |
| Average Functionality | 2.31 | 2.31 | 2.32 |
| Phenolic Equivalent Weight | 168.10 | 168.20 | 165.50 |
| Viscosity @ | | | |
| 130° C., cps | 586 | 4900 | 534 |
| , Pa.s | 0.586 | 4.900 | 0.534 |

*Not an example of the present invention.

TABLE II

FLUORINE, BORON AND POTASSIUM DISTRIBUTION IN HYDROCARBON NOVOLAC

|  | PRODUCT | PHENOL FRACTION 1 | PHENOL FRACTION 2 | PHENOL FRACTION 3 |
|---|---|---|---|---|
| COMP. EXPT. A* | | | | |
| Total wt., g | 156 | 31 | 324 | 70 |
| ppm F | 75 | 9360 | 365 | 10 |
| ppm B | 83 | 1300 | 23 | 10 |
| EXAMPLE 1 B | | | | |
| Total wt., g | 118 | 52 | 289 | 17 |
| ppm F | 4170 | 75 | 10 | 115 |
| ppm B | 1000 | 10 | 10 | 11 |
| EXAMPLE 1 C | | | | |
| Total wt., g | 110 | 53 | 257 | 25 |
| ppm F | 4360 | 180 | 80 | 10 |
| ppm B | 1100 | 10 | 10 | 10 |

*Not an example of the present invention.

TABLE III

FLUORINE, BORON AND POTASSIUM MASS BALANCE IN NEUTRALIZED HYDROCARBON NOVOLAC

|  | PRODUCT | PHENOL FRACTION 1 | PHENOL FRACTION 2 | PHENOL FRACTION 3 | TOTAL DETECTED | THEORETICAL TOTAL | % DETECTED |
|---|---|---|---|---|---|---|---|
| COMP. EXPT. A* | | | | | | | |
| Flourine, g | 0.0117 | 0.2902 | 0.1183 | 0.0007 | 0.4209 | 0.9687 | 43.45 |
| Boron, g | 0.1295 | 0.0403 | 0.0075 | 0.0007 | 0.1780 | 0.1837 | 96.9 |
| EXAMPLE 1-B | | | | | | | |
| Flourine, g | 0.4921 | 0.0039 | 0.0029 | 0.0020 | 0.5009 | 0.8119 | 61.69 |
| Boron, g | 0.1180 | 0.0005 | 0.0029 | 0.0002 | 0.1216 | 0.1540 | 78.9 |
| EXAMPLE 1-C | | | | | | | |
| Flourine, g | 0.4796 | 0.0095 | 0.0206 | 0.0003 | 0.5100 | 0.7155 | 71.28 |
| Boron, | 0.1210 | 0.0005 | 0.0026 | 0.0003 | 0.1244 | 0.1357 | 91.67 |

*Not an example of the present invention.

EXAMPLE 2

Production of Phenol-Dicyclopentadiene Novolac in 10-Gallon Pilot Plant Reactor Using KOH Neutralization Process Phenol (55 lbs., 265.7 moles) is melted in a stainless steel 10-gallon reactor, and while stirring at 56° C., $BF_3$ etherate (113.55 grams, 0.8 mole) is added. Dicyclopentadiene (7.68 lbs., 26.4 moles) is fed in over a period of 128 minutes while maintaining the temperature between about 65° and 77° C. and the pressure between about 19 and 24 psi. After completion of the dicyclopentadiene feed, the temperature is raised to 145° C. and held there for three hours, with the pressure remaining between 24 and 32 psi. The reaction mixture is then cooled to 60° C., and aqueous KOH (111.57 grams of a 44.1% aqueous KOH solution, 0.89 mole) is added. The mixture is heated to 145° C., and vacuum stripping begun to remove the excess phenol The vacuum stripping is continued for 340 minutes with the temperature ranging from 151° C. to 180° C. and the pressure ranging from 0.6 to 8.0 psi. This vacuum strip is then followed by a 30 minute steam strip at 177°–180° C. and 0.6–1.2 psi pressure. The steam is then cut off and vacuum stripping is continued for an additional 32 minutes at 177°–180° C. and about 1.2 psi pressure Approximately 15.2 lbs. of molten product are recovered.

The product has a Mettler softening point of 92.2° C. and a viscosity of 465 centipoise measured at 130° C. on a Brookfield viscometer. The average functionality determined by gel permeation chromatography is 2.32, and the phenolic equivalent weight is 165.7. The product contains 7940 ppm total fluorine and 800 ppm total boron, whereas the phenol recovered from the vacuum and steam stripping processes contain <100 ppm (limit of detection) total fluorine and 20–27 ppm total boron.

What is claimed is:

1. In a process for the preparation of hydrocarbon-aromatic hydroxyl-containing compound resins wherein an unsaturated hydrocarbon or mixture of unsaturated hydrocarbons are reacted with an aromatic hydroxyl-containing compound or mixture of such compounds in the presence of a Lewis acid and subsequently removing the unreacted aromatic hydroxyl-containing compound therefrom: the improvement which comprises neutralizing the Lewis acid with an inorganic base prior to recovery of unreacted aromatic hydroxyl-containing compound without removing the salts formed as a result of the catalyst neutralization.

2. The process of claim 1 wherein
   (a) the aromatic hydroxyl-containing compound and unsaturated hydrocarbon are employed in amounts which provide a molar ratio of aromatic hydroxyl-containing compound to unsaturated hydrocarbon of from about 1:1 to about 20:1;
   (b) the Lewis acid catalyst is employed in an amount which provides a molar ratio of Lewis acid to phenolic hydroxyl containing compound of from about 0.002:1 to about 0.1:1;
   (c) the inorganic base is employed in an amount which provides a molar ratio of inorganic base to Lewis acid of from about 1:1 to about 3:1;
   (d) the reaction between the unsaturated hydrocarbon and the hydroxyl containing compound is conducted at a temperature of from about 40° C. to about 180° C.;
   (e) the reaction between the unsaturated hydrocarbon and the hydroxyl containing compound is conducted for a time of from about 1.25 to about 16 hours;

(f) the neutralization reaction is conducted at a temperature of from about 30° C. to about 180° C.; and (g) the neutralization reaction is conducted for a time of from about 0.25 to about 4 hours.

3. The process of claim 1 wherein (a) the aromatic hydroxyl-containing compound and unsaturated hydrocarbon are employed in amounts which provide a molar ratio of aromatic hydroxyl-containing compound to unsaturated hydrocarbon of from about 2:1 to about 15:1;

(b) the Lewis acid catalyst is employed in an amount which provides a molar ratio of Lewis acid to phenolic hydroxyl containing compound of from about 0.003:1 to about 0.05:1;

(c) the inorganic base is employed in an amount which provides a molar ratio of inorganic base to Lewis acid of from about 1:1 to about 2:1;

(d) the reaction between the unsaturated hydrocarbon and the hydroxyl containing compound is conducted at a temperature of from about 50° C. to about 160° C.;

(e) the reaction between the unsaturated hydrocarbon and the hydroxyl containing compound is conducted for a time of from about 2.5 to about 12 hours:

(f) the neutralization reaction is conducted at a temperature of from about 30° C. to about 160° C.; and (g) the neutralization reaction is conducted for a time of from about 0.5 to about 3 hours.

4. The process of claim 1 wherein (a) the aromatic hydroxyl-containing compound and unsaturated hydrocarbon are employed in amounts which provide a molar ratio of aromatic hydroxyl-containing compound to unsaturated hydrocarbon of from about 3:1 to about 10:1;

(b) the Lewis acid catalyst is employed in an amount which provides a molar ratio of Lewis acid to phenolic hydroxyl containing compound of from about 0.003:1 to about 0.01:1;

(c) the inorganic base is employed in an amount which provides a molar ratio of inorganic base to Lewis acid of from about 1:1 to about 1.1:1;

(d) the reaction between the unsaturated hydrocarbon and the hydroxyl containing compound is conducted at a temperature of from about 60° C. to about 150° C.;

(e) the reaction between the unsaturated hydrocarbon and the hydroxyl containing compound is conducted at a pressure of from about 13 psia to about 60 psia;

(f) the reaction between the unsaturated hydrocarbon and the hydroxyl containing compound is conducted for a time of from about 4 to about 8 hours:

(g) the neutralization reaction is conducted at a temperature of from about 40° C. to about 150° C.;

(h) the neutralization reaction is conducted at a pressure of from about 13 psia to about 60 psia; and (i) the neutralization reaction is conducted for a time of from about 1 to about 2 hours.

5. The process of claim 1 wherein (a) said aromatic hydroxyl-containing compound is phenol;

(b) said unsaturated hydrocarbon is dicyclopentadiene;

(c) said Lewis acid is $BF_3$; and (d) said inorganic base is an alkali metal hydroxide.

6. The process of claim 5 wherein said inorganic base is potassium hydroxide.

7. The process of claim 2 wherein (a) said aromatic hydroxyl-containing compound is phenol;

(b) said unsaturated hydrocarbon is dicyclopentadiene:

(c) said Lewis acid is $BF_3$; and (d) said inorganic base is an alkali metal hydroxide.

8. The process of claim 7 wherein said inorganic base is potassium hydroxide.

9. The process of claim 3 wherein (a) said aromatic hydroxyl-containing compound is phenol;

(b) said unsaturated hydrocarbon is dicyclopentadiene;

(c) said Lewis acid is $BF_3$; and (d) said inorganic base is an alkali metal hydroxide.

10. The process of claim 9 wherein said inorganic base is potassium hydroxide.

11. The process of claim 4 wherein (a) said aromatic hydroxyl-containing compound is phenol;

(b) said unsaturated hydrocarbon is dicyclopentadiene;

(c) said Lewis acid is $BF_3$; and (d) said inorganic base is an alkali metal hydroxide.

12. The process of claim 11 wherein said inorganic base is potassium hydroxide.

* * * * *